US008073450B2

United States Patent
Jiang

(10) Patent No.: US 8,073,450 B2
(45) Date of Patent: Dec. 6, 2011

(54) METHOD AND APPARATUS FOR DE-ACTIVATING HYBRID AUTOMATIC REPEAT REQUEST PROCESS IN A WIRELESS COMMUNICATIONS SYSTEM

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 621 days.

(21) Appl. No.: 11/723,132

(22) Filed: Mar. 16, 2007

(65) Prior Publication Data

US 2007/0218907 A1  Sep. 20, 2007

Related U.S. Application Data

(60) Provisional application No. 60/743,561, filed on Mar. 20, 2006.

(51) Int. Cl.
*H04W 72/00* (2009.01)
(52) U.S. Cl. .......................... 455/450; 455/509; 370/235
(58) Field of Classification Search .......... 455/504–509, 455/574; 370/235, 335
See application file for complete search history.

(56) References Cited

U.S. PATENT DOCUMENTS

| 6,601,214 B1 | 7/2003 | Hammons, Jr. |
| 6,769,085 B2 | 7/2004 | Von Elbwart et al. |
| 6,798,846 B2 | 9/2004 | Von Elbwart et al. |
| 7,000,174 B2 | 2/2006 | Mantha et al. |
| 2006/0215560 A1* | 9/2006 | Sebire et al. ................ 370/235 |
| 2006/0292992 A1* | 12/2006 | Tajima et al. ............. 455/67.11 |
| 2007/0049309 A1* | 3/2007 | Pan et al. ...................... 455/509 |

FOREIGN PATENT DOCUMENTS

| KR | 10-2006-0053077 A | 5/2006 |
| TW | 220820 | 9/2004 |
| TW | 239741 | 9/2005 |

OTHER PUBLICATIONS

3GPP TSG-RAN-WG2 Meeting #47, R2-051707, May 2005.
Huawei, "E-DCH Serving Grant Update, R2-060547, 3GPP", Feb. 13-17, 2006.
Huawei, "E-DCH Serving Grant Update", R2-060623, 3GPP, Feb. 13-17, 2006.
3GPP TS 25.321 V6.7.0(Dec. 2005) Medium Access Control (MAC) protocol specification (Release 6).
Office Action on corresponding TW patent application No. 096109237 from TIPO dated Nov. 24, 2010.

* cited by examiner

*Primary Examiner* — Nick Corsaro
*Assistant Examiner* — Gerald Johnson
(74) *Attorney, Agent, or Firm* — Klein, O'Neill & Singh, LLP

(57) ABSTRACT

A method for handling de-activation of a first Hybrid Automatic Repeat Request (HARQ) process used in a mobile of a wireless communications system includes receiving a Primary Absolute Grant (AG) message indicating to de-activate the first HARQ process, de-activating the first HARQ process, and activating all HARQ processes and using a grant provided by a Secondary AG message as a serving grant if all the HARQ processes are de-activated and a secondary grant function is configured.

8 Claims, 4 Drawing Sheets

METHOD AND APPARATUS FOR DE-ACTIVATING HYBRID AUTOMATIC REPEAT REQUEST PROCESS IN A WIRELESS COMMUNICATIONS SYSTEM

CROSS REFERENCE TO RELATED APPLICATIONS

This application claims the benefit of U.S. Provisional Application No. 60/743,561, filed on Mar. 30, 2006 and entitled "Method and Apparatus for Deactivating Last HARQ Process," the contents of which are incorporated herein by reference.

BACKGROUND OF THE INVENTION

1. Field of the Invention

The present invention relates to HARQ process de-activation in wireless communications systems, and more particularly to a method and related apparatus for keeping a grant of a mobile to be affected by Secondary Absolute Grant messages after the last remaining HARQ process of the mobile is de-activated, so as to reduce signaling overhead of the network and avoid radio resource waste.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting third generation mobile telecommunication technology, the prior art provides High Speed Downlink Package Access (HSDPA) and High Speed Uplink Package Access (HSUPA), which are used to increase bandwidth utility rate and package data processing efficiency to improve uplink/downlink transmission rate.

HSUPA increases upstream network performance, reduces transmission delay by rapid retransmission of erroneous data transmissions, and can adjust transmission rate based on channel quality. To realize this type of "power control," HSUPA adopts technologies such as NodeB Scheduling, Hybrid Automatic Repeat Request (HARQ), Soft Handover, and Short Frame Transmission. Correspondingly, the 3rd Generation Partnership Project (3GPP) defines an Enhanced Dedicated Transport Channel (E-DCH) for controlling operations of HSUPA. E-DCH introduces new physical layer channels, such as E-HICH, E-RGCH, E-AGCH, E-DPCCH, and E-DPDCH, which are used for transmitting HARQ ACK/NACK, Uplink Scheduling Information, Control Plane information, and User Plane information. Detailed definitions of the above can be found in the Medium Access Control (MAC) protocol specification, "3GPP TS 25.321 V6.7.0," and are not given here.

Through Short Frame Transmission technology, HSUPA can configure 2 ms or 10 ms Transmit Time Interval (TTI), and the number of HARQ processes depends on the TTI durations. According to section 11.8.1.1.1 of the aforementioned MAC protocol specification, the number of HARQ processes is equal to the HARQ Round Trip Time (RTT), which is the time duration between the instant when a signaling is sent out and the instant when a response message is received. For 2 ms (millisecond) TTI, the HARQ RTT is equal to 8 TTIs, so the number of HARQ processes is equal to 8. For 10 ms TTI, the HARQ RTT is equal to 4 TTIs, so the number of HARQ processes is equal to 4.

In addition, through NodeB Scheduling technology, a base station (Node B) is allowed to adjust transmission power of mobiles or user equipments (UEs) within its transmission range (cell), so as to control uplink transmission rate of the mobiles. Referring to sections 9.2.5.2.1 and 9.2.5.2.2 of the aforementioned MAC protocol specification, the network can provide Relative Grant (RG) messages and Absolute Grant (AG) messages to a mobile through an E-DCH Relative Grant Channel (E-RGCH) and an E-DCH Absolute Grant Channel (E-AGCH) respectively, so as to adjust the transmission grant of the mobile. The E-AGCH is a shared channel that use an E-DCH Radio Network Temporary Identifier (E-RNTI) in order to address the AG messages to specific mobiles. The AG messages are used to directly adjust the transmission grant of mobiles, and can be classified into two types, Primary and Secondary. The Primary AG message provides an uplink resource grant for a specified mobile served by a cell. The Secondary AG message provides an uplink resource grant for a group of mobiles served by the cell, so as to reduce signaling overhead. On the other hand, the AG message includes an AG value field and an AG scope field. The AG value field indicates the transmission resource the mobile is allowed to use in the next transmission. The AG scope field indicates that the applicability of the AG value is "Per HARQ process" or "All HARQ Processes," meaning whether the AG value field will affect one or all HARQ processes.

According to section 11.8.1.3.1 of the aforementioned MAC protocol specification, after a mobile receives an AG message, if the E-RNTI type is "Primary," the AG value is set to "INACTIVE," the AG scope is "Per HARQ process," and a 2 ms TTI is configured, then the mobile shall de-activate a current HARQ process, which is the process identified by the value of a variable CURRENT_HARQ_PROCESS. If the E-RNTI type is "Primary," the AG value is set to "INACTIVE," the AG scope is "All HARQ processes," and a secondary E-RNTI was configured by higher layers, then the mobile shall activate all HARQ processes, set Serving Grant (SG) value to stored secondary grant (Serving_Grant=Stored_Secondary_Grant), and set a primary grant state variable to "none" (Primary_Grant_Available=false), meaning that the SG value can be affected by Secondary AG messages. Besides, if the AG value is different from "INACTIVE," and the E-RNTI type is "Secondary," then the mobile shall set the variable Stored_Secondary_Grant to the AG value. Oppositely, if the E-RNTI type is "Primary" or the variable Primary_Grant_Available is set to "False," then the mobile shall set the SG value to the AG value (Serving_Grant=AG value). Note that, definitions of "INACTIVE," "Stored_Secondary_Grant," "Primary_Grant_Available," and "Serving_Grant" can be found in section 3.1.2 of the aforementioned MAC protocol specification.

Therefore, when the Primary AG message sets the AG value to "INACTIVE" and the AG Scope indicates "Per HARQ process" while a 2 ms TTI is configured, the prior art simply de-activates the corresponding HARQ process and keeps the variable Primary_Grant_Available unchanged. The variable Primary_Grant_Available represents whether the SG value is only affected by the Primary AG and RG messages. If Primary_Grant_Available="True," the SG value is only affected by the Primary AG or RG messages. If Primary_Grant_Available="False," the SG value is affected by the Primary AG, Secondary AG, or RG messages. In such situation, if all the HARQ processes are de-activated, the prior art may waste signaling transmission.

For example, suppose that the mobile has one remaining active process while a 2 ms TTI is configured. Thus, Primary_Grant_Available="True". Suppose the serving cell sends a Primary AG message, where the AG value is set to "INACTIVE" and the AG Scope indicates "Per HARQ process". By the prior art, the variable Primary_Grant_Available is kept to "True" and the remaining active process is deactivated. Since the variable Primary_Grant_Available is "True," the SG value is only affected by the Primary AG or RG messages. Therefore, the grant provided by earlier Secondary AG messages cannot be used. Furthermore, any future Secondary AG messages will not activate HARQ processes. The only way to activate HARQ processes is through the Primary AG message. As a result, the advantage of the Secondary AG messages vanishes, and signaling overhead is increased.

SUMMARY OF THE INVENTION

According to the present invention, a method for handling de-activation of a first Hybrid Automatic Repeat Request (HARQ) process used in a mobile of a wireless communications system comprises receiving a Primary Absolute Grant (AG) message indicating to de-activate the first HARQ process, de-activating the first HARQ process, and activating all HARQ processes and using a grant provided by a Secondary AG message as a serving grant if all the HARQ processes are de-activated and a secondary grant function is configured.

According to the present invention, a communications device of a wireless communications system utilized for handling de-activation of a first Hybrid Automatic Repeat Request (HARQ) process to avoid radio resource waste comprises a control circuit for realizing functions of the communications device, a processor installed in the control circuit for executing a program code to operate the control circuit, and a memory coupled to the processor for storing the program code. The program code comprises receiving a Primary Absolute Grant (AG) message indicating to de-activate the first HARQ process, de-activating the first HARQ process, and activating all HARQ processes and using a grant provided by a Secondary AG message as a serving grant if all the HARQ processes are de-activated and a secondary grant function is configured.

According to the present invention, a method for de-activating a first Hybrid Automatic Repeat Request (HARQ) process of a mobile used in a network of a wireless communications system comprises setting a scope of a Primary Absolute Grant (AG) message indicating the mobile to de-activate the first HARQ process to "All HARQ processes" when a secondary grant function of the mobile is configured and the first HARQ process is the last remaining active HARQ process of the mobile, and outputting the Primary AG message to the mobile.

According to the present invention, a communications device of a wireless communications system utilized for de-activating a first Hybrid Automatic Repeat Request (HARQ) process of a mobile to avoid radio resource waste comprises a control circuit for realizing functions of the communications device, a processor installed in the control circuit for executing a program code to operate the control circuit, and a memory coupled to the processor for storing the program code. The program code comprises setting a scope of a Primary Absolute Grant (AG) message indicating the mobile to de-activate the first HARQ process to "All HARQ processes" when a secondary grant function of the mobile is configured and the first HARQ process is the last remaining active HARQ process of the mobile, and outputting the Primary AG message to the mobile.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
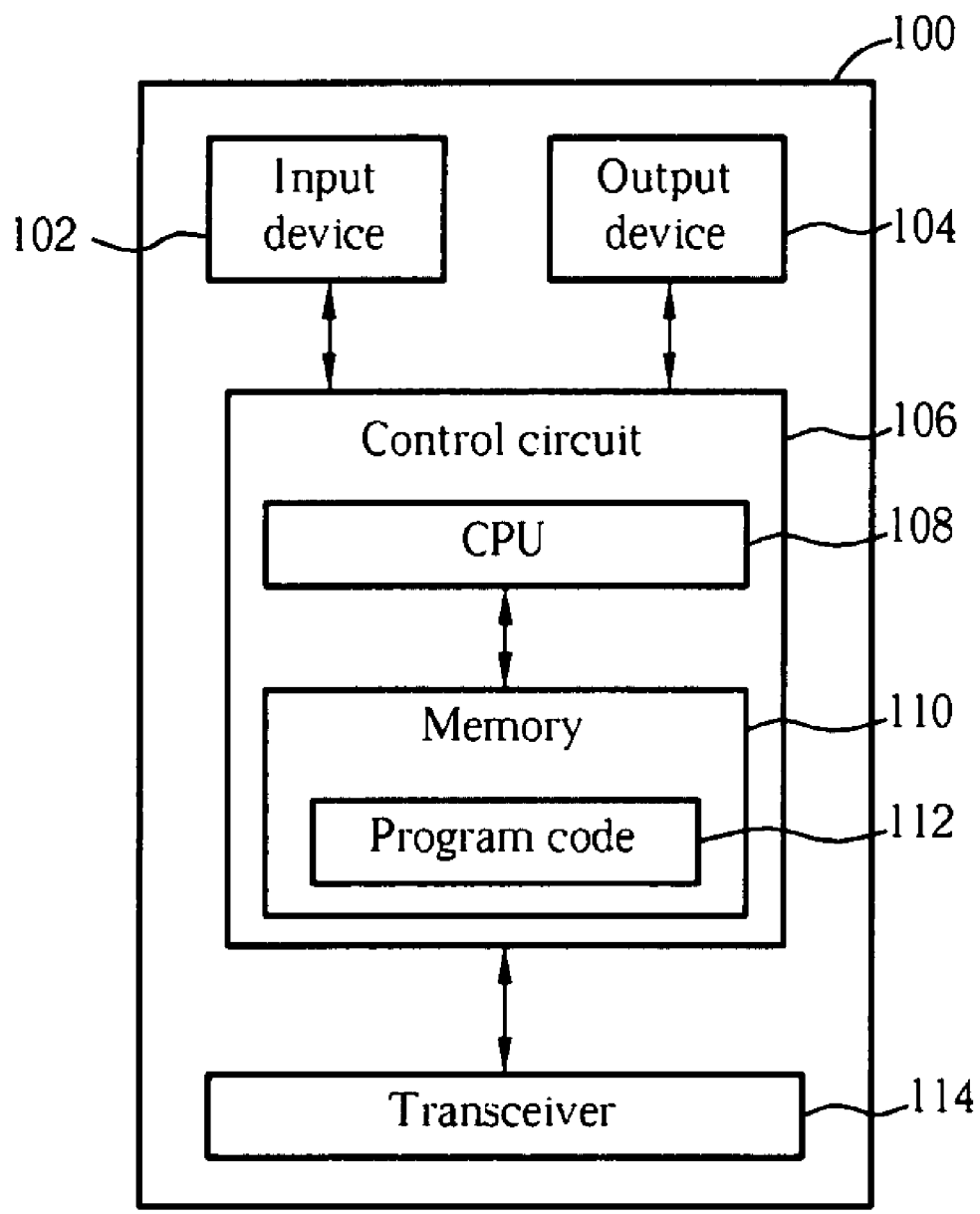
FIG. 1 is a function block diagram of a wireless communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
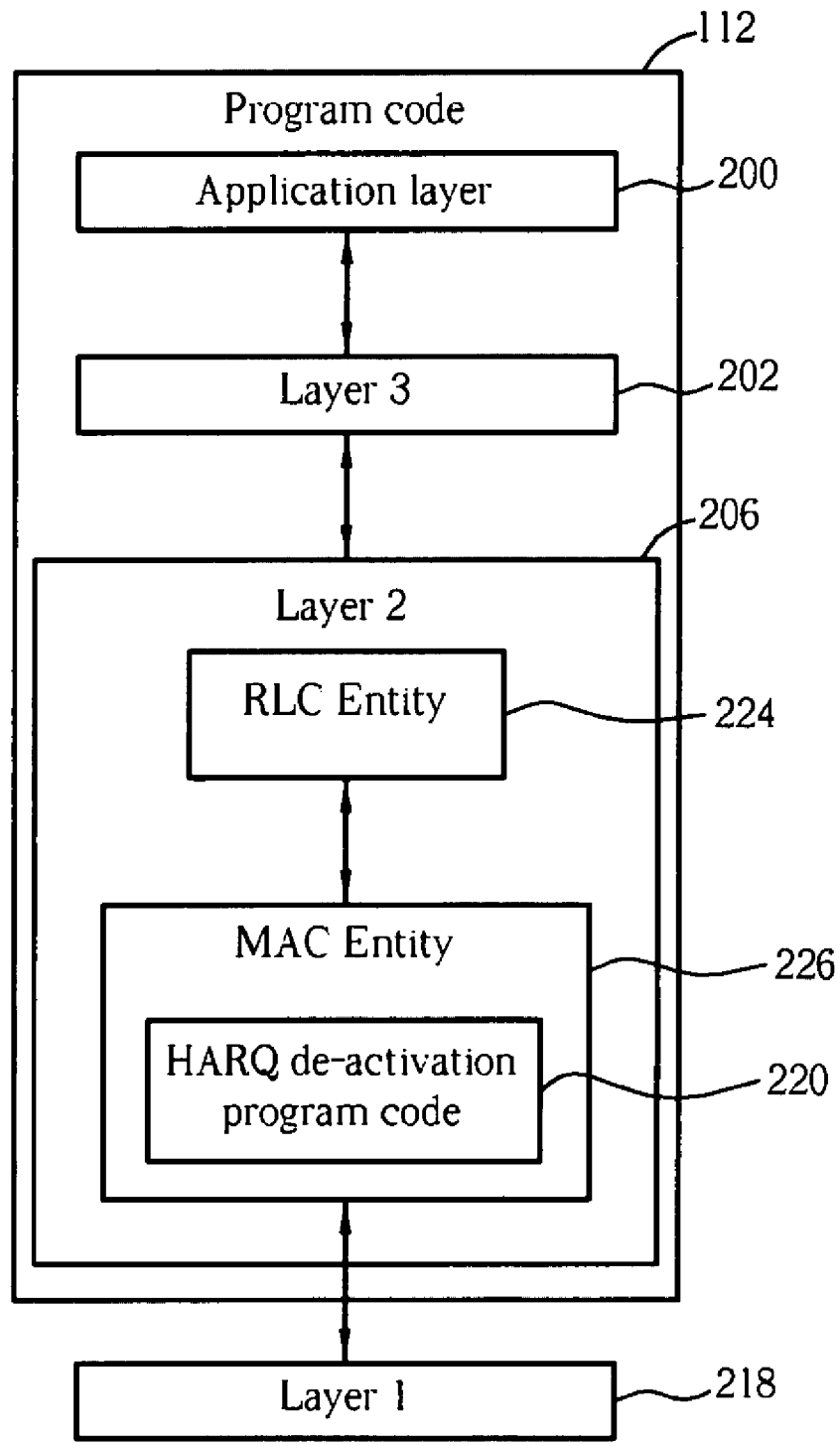
FIG. 2 is a diagram of program code of FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, ciphering, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Figure 3:
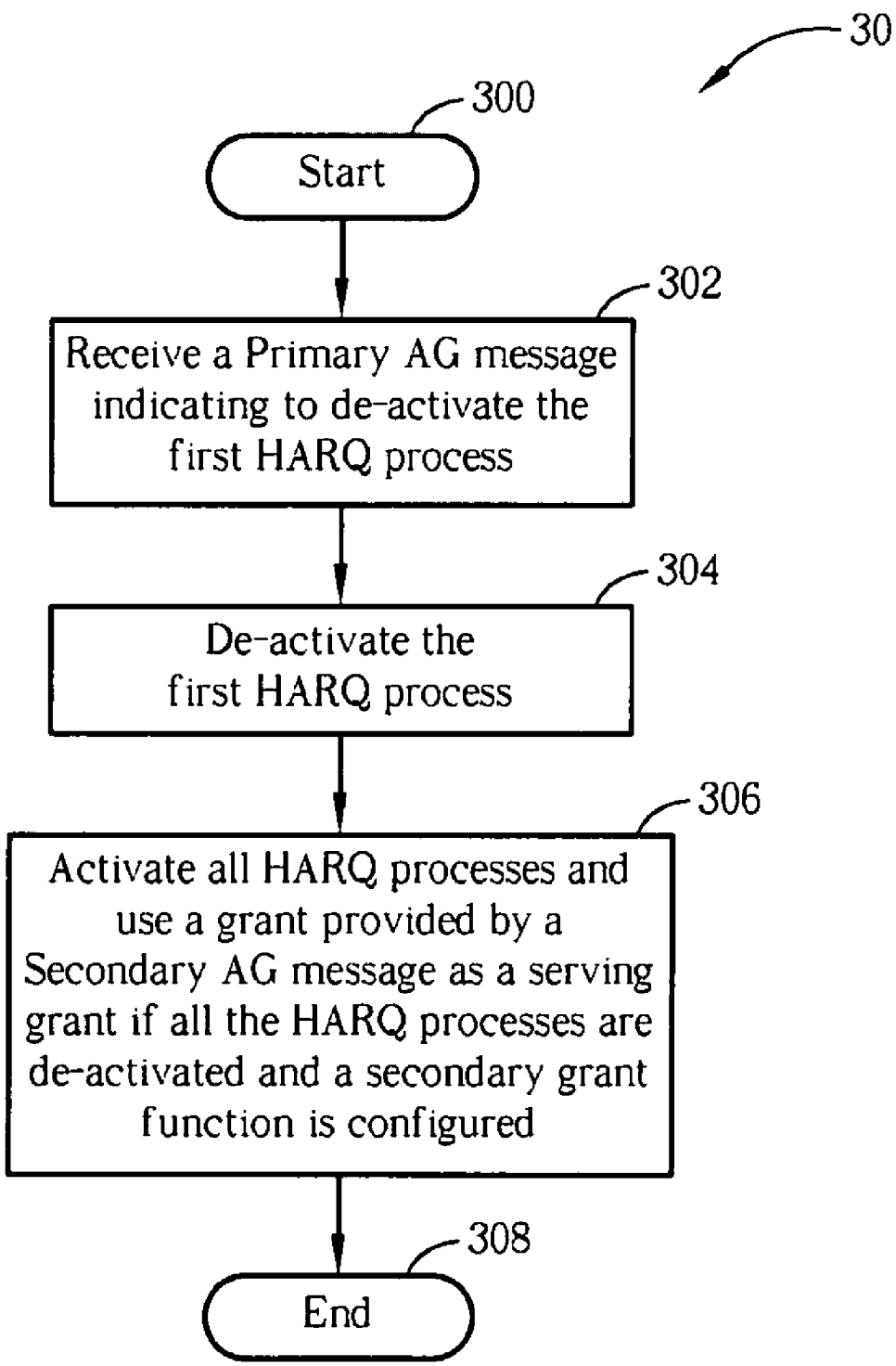
FIG. 3 is a flowchart of a process according to the embodiment of the present invention.

In some applications, such as when realizing high-speed uplink packet access (HSUPA) functions, the MAC entity 226 can de-activate HARQ processes according to a Primary AG message provided by the network. In this situation, the embodiment of the present invention provides an HARQ de-activation program code 220 utilized for handling HARQ de-activation, in order to avoid radio resource waste, and reduce unnecessary transmissions. Please refer to FIG. 3, which is a flowchart diagram of a process 30 according to the embodiment of the present invention. The process 30 is utilized in a mobile of the wireless communications system for handling de-activation of a first HARQ process, and can be complied into the HARQ de-activation program code 220. The process 30 comprises the following steps:

Step 300: Start.

Step 302: Receive a Primary AG message indicating to de-activate the first HARQ process.

Step 304: De-activate the first HARQ process.

Step 306: Activate all HARQ processes and use a grant provided by a Secondary AG message as a serving grant if all the HARQ processes are de-activated and a secondary grant function is configured.

Step 308: End.

According to the process 30, after the last remaining active HARQ process of the mobile is de-activated, the mobile uses the grant provided by the Secondary AG message. Preferably, a 2 ms TTI is configured, and the scope of the Primary AG message is "Per HARQ process." Under such circumstance, after the mobile receives an AG message, if the E-RNTI type is "Primary", the AG value is set to "INACTIVE", the AG scope is "Per HARQ process", and a 2 ms TTI is configured, then the mobile will de-activate a current HARQ process, which is the process given by the value of a variable CURRENT_HARQ_PROCESS. Meanwhile, if all the HARQ processes are de-activated, and a Secondary E-RNTI was configured for the mobile, then the mobile will activate all the HARQ processes, set the SG value to the stored secondary grant (Serving_Grant=Stored_Secondary_Grant), and set the variable Primary_Grant_Available to false. As a result, the mobile can use AG value provided by the Secondary AG messages, and future Secondary AG messages can activate or affect HARQ processes. Therefore, signaling overhead of the serving cell can be reduced.

As mentioned above, the Primary AG message provides the uplink resource grant for a specified mobile served by a cell, while the Secondary AG message provides the uplink resource grant for a group of mobiles served by the cell. In the prior art, after the last remaining HARQ process is de-activated, the mobile cannot use the grant provided by the Secondary AG messages, such that the only way to activate HARQ processes is through the Primary AG message, and signaling overhead is increased. In comparison, through the process 30, after the last remaining HARQ process is de-activated, the mobile can use the grant provided by the Secondary AG message, and signaling overhead can be reduced accordingly.

Figure 4:
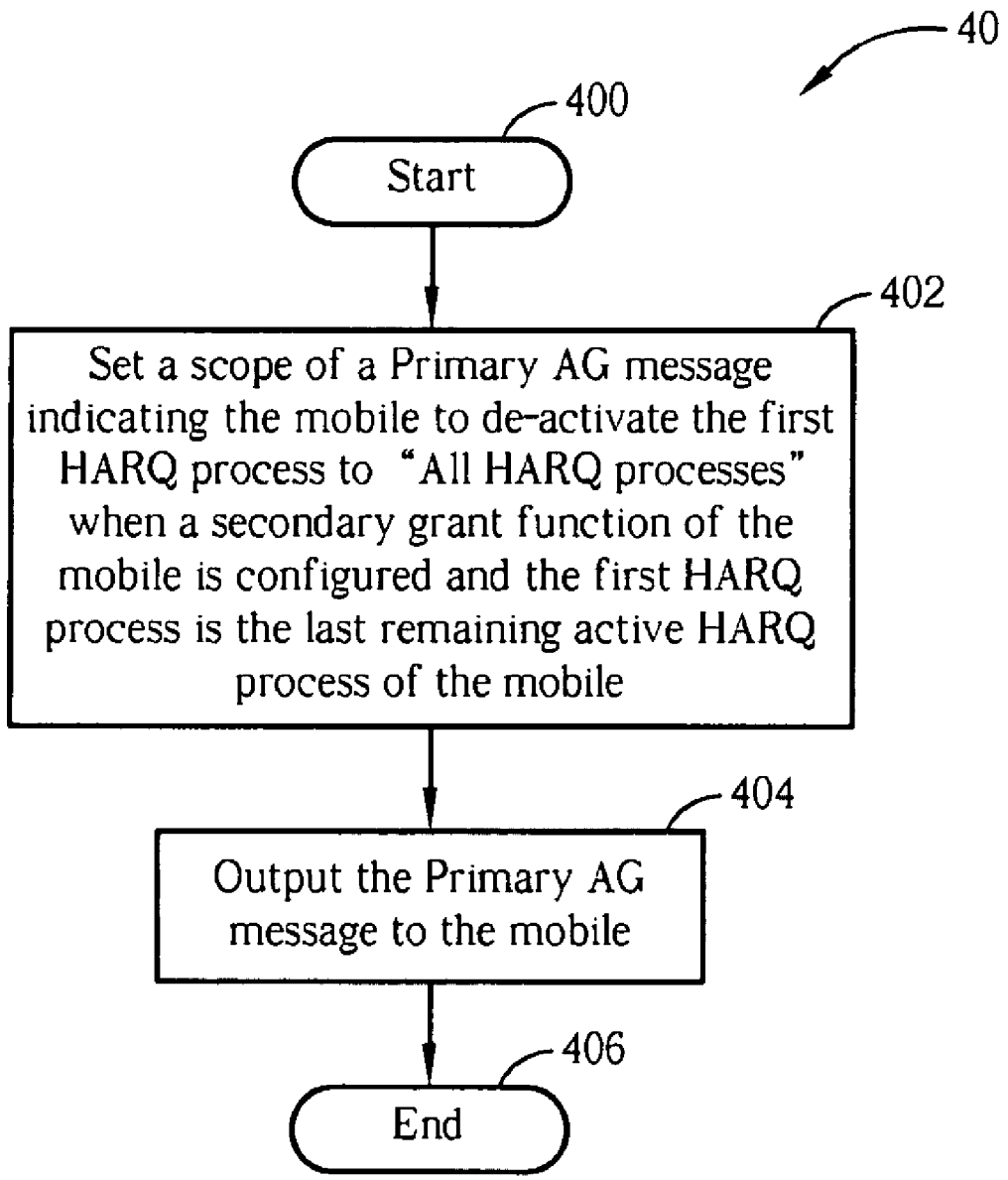
FIG. 4 is a flowchart of another process according to the embodiment of the present invention.

The process 30 is used in the mobile for reducing signaling overhead of the network. The embodiment of the present invention further provides an embodiment for the network. Please refer to FIG. 4, which is a flowchart diagram of a process 40 according to the embodiment of the present invention. The process 40 is used in the network of the wireless communications system for de-activating a first HARQ process of a mobile, and can be complied into the HARQ de-activation program code 220. The process 40 comprises the following steps:

Step 400: Start.

Step 402: Set a scope of a Primary AG message indicating the mobile to de-activate the first HARQ process to "All HARQ processes" when a secondary grant function of the mobile is configured and the first HARQ process is the last remaining active HARQ process of the mobile.

Step 404: Output the Primary AG message to the mobile.

Step 406: End.

According to the process 40, when the network de-activates the last remaining HARQ process of the mobile through a Primary AG message, if a Secondary E-RNTI was configured for the mobile (the secondary grant function of the mobile was started), then the network sets the scope of the Primary AG message to "All HARQ processes." As a result, after the mobile receives the Primary AG message, the mobile will activate all the HARQ processes, set the SG value to the stored secondary grant (Serving_Grant=Stored_Secondary_Grant), and set the variable Primary_Grant_Available to false (that is, the SG value can be affected by Secondary AG messages).

Therefore, through the process 40, when the network is to de-activate the last remaining HARQ process of the mobile with a Primary AG message, the network will set the AG scope of the Primary AG message to "All HARQ processes." Therefore, after receiving the Primary AG message, the mobile will set the variable Primary_Grant_Available to false, so that the network can control the grant of the mobile with the Secondary AG messages, and signaling overhead can be reduced accordingly.

In summary, the embodiment of the present invention provides the methods used in the mobile and the network for keeping the grant of the mobile to be affected by the Secondary AG messages after the last remaining HARQ process is de-activated, so as to reduce signaling overhead of the network and avoid radio resource waste.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling de-activation of a first Hybrid Automatic Repeat Request (HARQ) process used in a mobile of a wireless communications system comprising:

receiving a Primary Absolute Grant (AG) message indicating to de-activate the first HARQ process wherein the Primary AG message affects one HARQ process;

de-activating the first HARQ process; and activating all HARQ processes and using a grant provided by a Secondary AG message as a serving grant if all the HARQ processes are de-activated after de-activating the first HARQ process and a secondary grant function is configured;

wherein a 2 ms transmit time interval is configured.

2. A communications device of a wireless communications system utilized for handling de-activation of a first Hybrid Automatic Repeat Request (HARQ) process to avoid radio resource waste comprising:

a control circuit for realizing functions of the communications device;

a processor installed in the control circuit for executing a program code to operate the control circuit; and a memory coupled to the processor for storing the program code;

wherein the program code comprises:

receiving a Primary Absolute Grant (AG) message indicating to de-activate the first HARQ process wherein the Primary AG message affects one HARQ process;

de-activating the first HARQ process; and activating all HARQ processes and using a grant provided by a Secondary AG message as a serving grant if all the HARQ processes are de-activated after deactivating the first HARQ process and a secondary grant function is configured;

wherein a 2 ms transmit time interval is configured.

3. The method of claim 1, wherein the wireless communications system is a high speed uplink packet access system of a third generation (3G) mobile communications system.

4. A method for de-activating a first Hybrid Automatic Repeat Request (HARQ) process of a mobile used in a network of a wireless communications system comprising:

setting a scope of a Primary Absolute Grant (AG) message indicating the mobile to de-activate the first HARQ process to "All HARQ processes" when a secondary grant function of the mobile is configured and the first HARQ process is the last remaining active HARQ process of the mobile; and outputting the Primary AG message to the mobile.

5. A communications device of a wireless communications system utilized for de-activating a first Hybrid Automatic Repeat Request (HARQ) process of a mobile to avoid radio resource waste comprising:

a control circuit for realizing functions of the communications device;

a processor installed in the control circuit for executing a program code to operate the control circuit; and a memory coupled to the processor for storing the program code;

wherein the program code comprises:

setting a scope of a Primary Absolute Grant (AG) message indicating the mobile to de-activate the first HARQ process to "All HARQ processes" when a secondary grant function of the mobile is configured and the first HARQ process is the last remaining active HARQ process of the mobile; and outputting the Primary AG message to the mobile.

6. The method of claim 4, wherein the wireless communications system is a high speed uplink packet access system of a third generation (3G) mobile communications system.

7. The communications device of claim 2, wherein the wireless communications system is a high speed uplink packet access system of a third generation (3G) mobile communications system.

8. The communications device of claim 5, wherein the wireless communications system is a high speed uplink packet access system of a third generation (3G) mobile communications system.

* * * * *